(12) United States Patent
Biehler et al.

(10) Patent No.: US 8,539,122 B2
(45) Date of Patent: Sep. 17, 2013

(54) SUBMODULE AND METHOD FOR EXCHANGING PERIPHERAL DATA

(75) Inventors: Georg Biehler, Nuremberg (DE); Harald Hammon, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 182 days.

(21) Appl. No.: 13/190,774

(22) Filed: Jul. 26, 2011

(65) Prior Publication Data
US 2012/0036283 A1  Feb. 9, 2012

(30) Foreign Application Priority Data
Jul. 26, 2010 (EP) .................. EP10170756

(51) Int. Cl.
*G06F 13/12* (2006.01)
*G06F 3/00* (2006.01)
(52) U.S. Cl.
USPC ..................... 710/62; 710/3; 710/8

(58) Field of Classification Search
None
See application file for complete search history.

(56) References Cited

U.S. PATENT DOCUMENTS

| | | | | |
|---|---|---|---|---|
| 7,287,114 B2 * | 10/2007 | Sullivan | ......................... | 710/316 |
| 7,925,817 B2 * | 4/2011 | Uehara et al. | ................. | 710/316 |
| 8,352,665 B2 * | 1/2013 | Nakayama et al. | ........... | 710/313 |
| 2004/0054829 A1 * | 3/2004 | White et al. | .................. | 710/105 |
| 2006/0161705 A1 | 7/2006 | Kynast | | |
| 2009/0138693 A1 | 5/2009 | Chomik | | |
| 2010/0146225 A1 * | 6/2010 | Biehler et al. | ................ | 711/154 |

\* cited by examiner

*Primary Examiner* — Idriss N Alrobaye
*Assistant Examiner* — David Martinez
(74) *Attorney, Agent, or Firm* — Cozen O'Connor

(57) ABSTRACT

A method for exchanging peripheral data and submodule, wherein a transfer means is embedded into an operating system of the submodule for the exchange of the peripheral data with a main module to accelerate a process of copying input/output data from a decentralized peripheral system to a superordinate level.

6 Claims, 3 Drawing Sheets

SUBMODULE AND METHOD FOR EXCHANGING PERIPHERAL DATA

BACKGROUND OF THE INVENTION

1. Field of the Invention

The invention relates to a method for the data exchange of peripheral data between a main module and a submodule, where a peripheral unit is connected to the submodule and data are read in or output using the peripheral unit.

The method comprises defining a peripheral transfer data record having a first address range of a peripheral unit and a second address range of a main module, and mapping the peripheral data prevailing in the first address range into the second address range and/or mapping the peripheral data prevailing in the second address range into the first data range.

The invention also relates to a submodule for exchanging peripheral data with a main module, comprising an operating system, an application program for implementing control tasks, and an interface, which is configured to read in data from a peripheral unit and/or output data to the peripheral unit.

2. Description of the Related Art

In the area of field buses, such as the Profibus Decentralized Peripherals (DP), methods and control systems are known in which a superordinate controller is connected to a field bus and the field bus is in turn connected to automation units, which represent a decentralized peripheral system. In general, the automation units are designed as input/output assemblies and can be directly connected to sensors and actuators in an automation installation on site at the machines. The decentralized input/output assemblies can be connected to a main module directly or to the main module by a submodule. In the latter configuration, a commissioner in the case of an automation installation of this type is faced with the problem of correspondingly mapping the input/output addresses of the decentralized peripheral system to address ranges in the main module. For this purpose, in accordance with conventional practices, in an application program of the submodule, for example, where the application program is designed as a cyclically executed programmable logic controller (PLC) program, the assignment is performed using a copy mechanism.

In addition, functional components, such as DB-send and DB-receive are available in the application program. The peripheral data of the input/output units are read in from the submodule and stored in a data component, where an assignment to an address range in the main module occurs and the address ranges thus assigned or the data contents thereof are transmitted to the main module under a transmission command. The application program copies the input/output data of the decentralized peripheral system and makes them available over a data interface to the superordinate main module. As a result, the superordinate main module is additionally burdened with computational complexity. This additional burden is associated with an execution time of the application program in the processing cycle of a programmable logic controller.

The run time of this application cycle has the critical responsibility of ensuring that the input/output data is up-to-date. For an installation operator with an industrial automation installation equipped with automation devices that forward decentralized peripheral data to a superordinate main module, it is important on account of an optimized control process to obtain the peripheral data at the "correct" point in time. Moreover, for the installation operator it is desirable for the application program not to be concerned with unnecessary copy tasks.

SUMMARY OF THE INVENTION

It is therefore an object of the present invention to provide a method for exchanging data in which the burden on the application program is reduced. It is also an object of the invention to provide a submodule for the exchanging peripheral data with a main module that is configured to achieve a reduction of the burden on the application program.

These and other objects and advantages are achieved by creating a copy list that contains the peripheral transfer data record that is allocated a data range indication and a direction indication, where the copy list is then stored in the submodule and a transfer device is embedded into an operating system, and where the transfer device accesses the copy list and allocates the peripheral data to the corresponding address ranges based on the peripheral transfer data record. This solution achieves a displacement of a copy cycle into the operating system of a submodule, and hence independence of an application program executed in the submodule. An application cycle is no longer delayed by the copy tasks of peripheral data.

In an embodiment, a memory area derived from the peripheral transfer data record is made available in the submodule and, with the memory area, a data interface for transferring the peripheral data to the main module and for transferring the peripheral data from the main module to the memory area is provided. The data interface, which is defined by a memory area, can be regarded as a type of transfer area in the submodule. Peripheral data of the type input data, output data or mixed data comprising input/output data, of any desired data interface and a predeterminable length, can be stored in the transfer area. The data structure and the length then correspond to the data structure as that which prevails at the peripheral units. Here, the data interface is furthermore configured to detect possible peripheral access errors during copying. These peripheral access errors can then be detected, for example, by the useful data companions Input/Output Operations Per Second (IOPS) and Input/Output Control System (IOCS), where are customary in the case of a PROFINET IO protocol, and a superordinate controller or the main module thus obtains information about access problems of the subordinate peripheral system.

In a further embodiment, a priority list is added to the copy list, where the priority list is processed as a priority by the transfer device for time-critical data. At the peripheral units, for example, it is possible to send important data records and/or alarms to which it is necessary to react as rapidly as possible. If such an alarm is stored in the priority list, for example, then the transfer device is designed to process these time-critical alarms as a priority.

It is also advantageous if an application program executed in the submodule can access the exchanged peripheral data.

In a further optional method step, the copy list is created by of a configuration tool, where the configuration tool accesses configuration data with regard to a physical construction of the main module and submodules subordinate thereto, and the peripheral units are subdivided into peripheral units assigned centrally to the submodule and into peripheral units assigned to the submodule in a decentralized manner. Configuration tools are already available to configure a physical configuration of automation components in an installation interconnection. These configuration tools are advantageously developed in terms of method technology such that a corresponding configuration of the user can be projected into main modules and/or submodules with central or decentralized assemblies.

The object of the invention is also achieved by a submodule for the exchanging peripheral data with a main module. Here, the submodule comprises an operating system, an application program for implementing control tasks, and an interface configured to read in data from a peripheral unit and/or outputting data to the peripheral unit. The submodule is distinguished by having a transfer device embedded into the operating system, where the transfer device is configured to access a copy list and to perform a data exchange between the submodule and the main module. As a result, it is possible to achieve a reduction of the burden on the application program.

The following advantages are afforded for an installation operator and a project planner who has to design the corresponding installation with submodules of this type. For example, a user can configure a "transparent" peripheral system for data exchange with a main module in a simple manner. Performance of the application program is increased because the application program is no longer responsible for copy tasks or peripheral data. The up-to-date nature of the data is therefore likewise increased. By embedding the transfer device into the operating system, a copy cycle can be performed more rapidly than in the application program.

Preferably, the submodule is equipped with a data interface for transferring the peripheral data with a copy list to the main module and for transferring the peripheral data with the copy list from the main module to the submodule, where the copy list contains a peripheral transfer data record having a data range indication and a direction indication, and the transfer device is furthermore configured to provide the peripheral data in accordance with the copy list in the data interface. Here, the data interface is preferably configured as a predeterminable memory area in the submodule.

In a further embodiment, the submodule has an internal interface for connecting peripheral units that are assigned centrally to the submodule. Here, the submodule can be envisaged as an expandable decentralized peripheral unit with an integrated CPU. Depending on the application, additional assemblies for inputting and outputting data can be attached to this expandable peripheral unit.

In a further embodiment, the submodule has a second interface that is configured to connect peripheral units that are assigned to the submodule in a decentralized manner, where the second interface comprises a field bus interface.

Preferably, the submodule has a first interface for connecting the main module. In one embodiment, the first interface comprises an I/O interface for Profinet, i.e., for an industrial Ethernet, and the second interface comprises a Profibus DP interface.

The submodule expediently has a priority device which is configured to access a priority list to react to time-critical signals or alarms, and to correspondingly control the transfer device in accordance with a time-critical peripheral datum to be exchanged, where the transfer device is configured to react to a priority signal.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment and further advantages of the invention are elucidated in greater detail in the drawing, in which.

DETAILED DESCRIPTION OF THE PRESENTLY PREFERRED EMBODIMENTS

Figure 1:
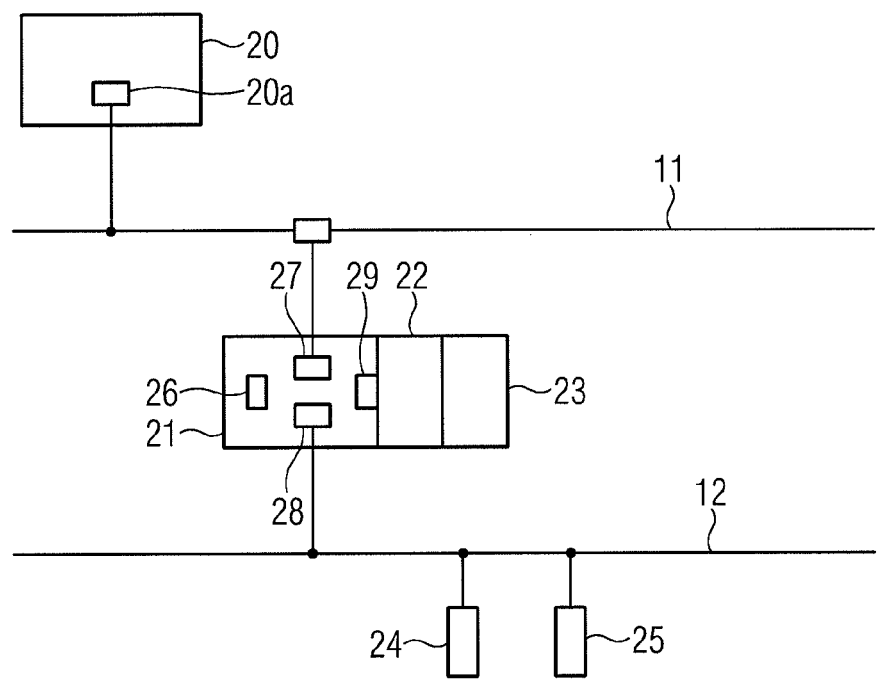
FIG. 1 is a schematic block diagram of a main module and a submodule in a field bus interconnection in accordance with an embodiment of the invention.

FIG. 1 is a schematic block diagram of an automation installation comprising a main module 20 and a submodule 21. The main module 20 is connected by a main module interface 20a to the submodule 21 through a first field bus 11, and the submodule 21 has a first interface 27 for connection to the first field bus 11. The submodule 21 is connected by a second interface 28 to a second field bus 12. The second field bus 12 is in turn connected to a third peripheral unit 24 and a fourth peripheral unit 25. Here, the peripheral units 24, 25 comprise peripheral units arranged in a decentralized manner with respect to the submodule 21. As a counterpart to the decentralized peripheral units 24, 25, the submodule 21 has a first peripheral unit 22 and a second peripheral unit 23, as peripheral units arranged centrally with respect to the submodule 21. For exchanging peripheral data between the main module 20 and the submodule 21, when the peripheral units 22, 23 are directly connected to the submodule 21 and the peripheral units 24, 25 are connected in a manner remote from the submodule 21 over the second field bus 12, peripheral transfer data records are defined, where these peripheral data records have a first address range of the respective peripheral units 22, 23, 24, 25 and a second address range of the main module 20. Peripheral transfer data records 41, 42, 43 (see FIG. 3) map the peripheral data prevailing in the first address range into the second address range and/or map the peripheral data prevailing in the second address range into the first address range. A data interface 26 is provided in the submodule for this mapping.

Figure 2:
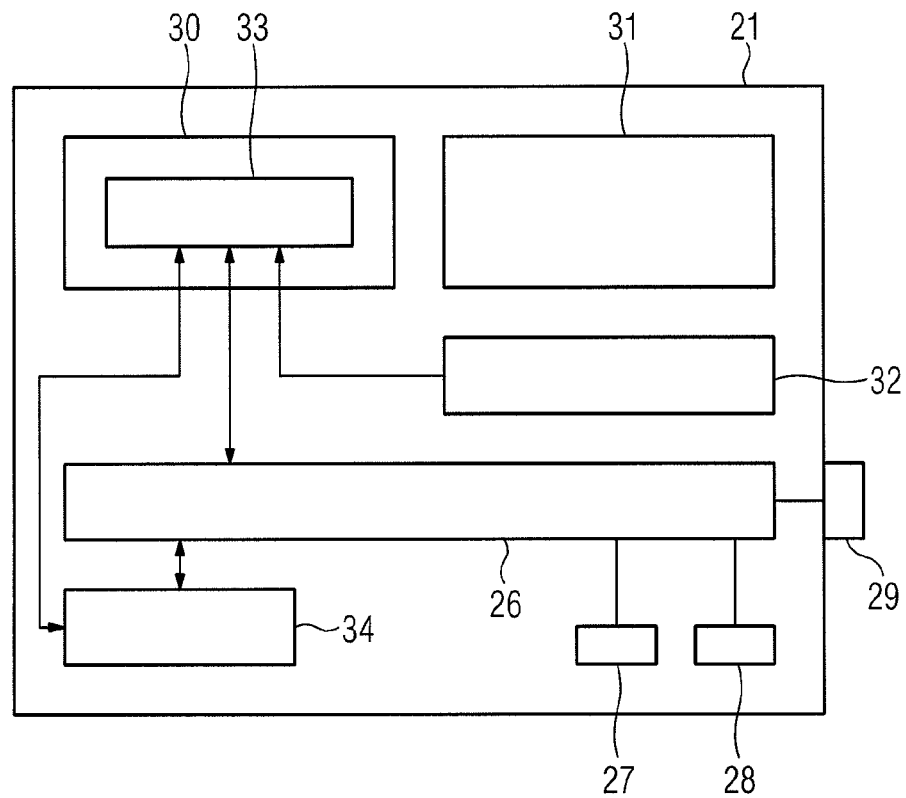
FIG. 2 is a schematic block diagram of a submodule in accordance with an embodiment of the invention.

FIG. 2 schematically illustrates the submodule 21 depicted in FIG. 1. With reference to FIG. 2, the submodule 21 has an operating system 30, an application program 31, a data interface 26, a copy list 32, a priority device 34 and interfaces for communication with the outside world. The interfaces include an internal interface 29, to which further peripheral assemblies can be attached directly to the submodule 21, the first interface 27, for connection to a superordinate level over a field bus (not shown), and the second bus interface 28 for connection to a subordinate level over a further field bus (not shown). The operating system 30 controls the internal sequences of the submodule 21. Preferably, the submodule 21 is configured as an independent programmable logic controller (PLC). An application-dependent application program 31 is used for implementing tasks appertaining to control technology. A transfer device 33 is embedded into the operating system 30, where transfer device 33 is configured to access the copy list 32 and to perform data exchange between the submodule 21 and the main module 20 (see FIG. 1). As a result, it is possible to achieve a reduction of the burden on the application program 31.

The peripheral data can be exchanged not only from the submodule 21 to the main module, but also from the main module 20 to the submodule 21. The copy list 32 contains a plurality of peripheral transfer data records 41, 42, 43 (see FIG. 3). The peripheral transfer data records 41, 42, 43 in turn have a data range indication 41a, 42a, 43a and a direction indication 41b, 42b, 43b. The transfer device 33 is furthermore configured to provide the peripheral data in accordance with the indications in the copy list 32 in the data interface. For example, the indication of a slot, a subslot and address type for an I/O controller is entered in the copy list. In the submodule 21, an address type, a start address, a length and optionally a process image for input data are then designated by the copy list. For output data, a start address, a length and a process image are likewise stipulated in the copy list. A direction indication 41b indicates where the input/output data are intended to be copied. For example, a direction indication from the submodule to the main module is a valid direction indication.

The copy list 32 is created by a configuration tool. Here, the configuration tool has recourse to physical construction data of the automation construction illustrated in FIG. 1. For the peripheral units 22, . . . , 25 it holds true that they can be arranged either centrally with respect to the submodule 21 or in a decentralized manner with respect to the submodule 21. A user can then select, with the aid of the configuration tool, central or decentralized peripheral units, submodules, modules or group fields in the peripheral system. A corresponding transfer area for the interface 26 is made available by this selection performed based on programming. This interface is also known to the person skilled in the art as an input device (I-device) interface.

For project planning using the configuration tool, the following advantages are afforded for the installation user. For example, a user can configure a transparent peripheral system at the I-device interface in a simple manner. The performance of the peripheral transfer areas, i.e., the "freshness" of the data, is optimized and is independent of a copy cycle that would normally be performed in an application program with an application cycle.

Figure 3:
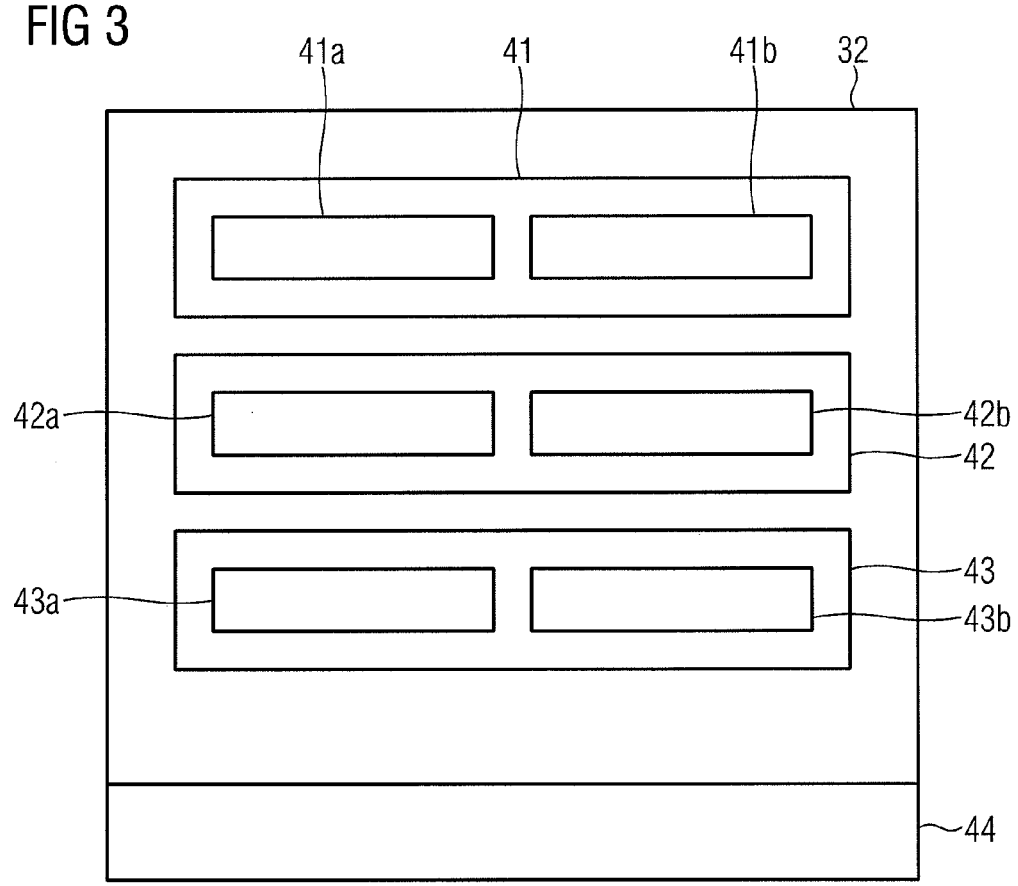
FIG. 3 is a schematic block diagram of an exemplary structure of a copy list in accordance with an embodiment of the invention.

FIG. 3 shows a copy list 32 comprising three peripheral transfer data records 41, 42, 43. A first peripheral transfer data record 41 has a first range indication 41a and a first direction indication 41b. A priority list 44 is available in the copy list 32 for the time-critical data exchange of, for example, alarms or particular data records.

Figure 4:
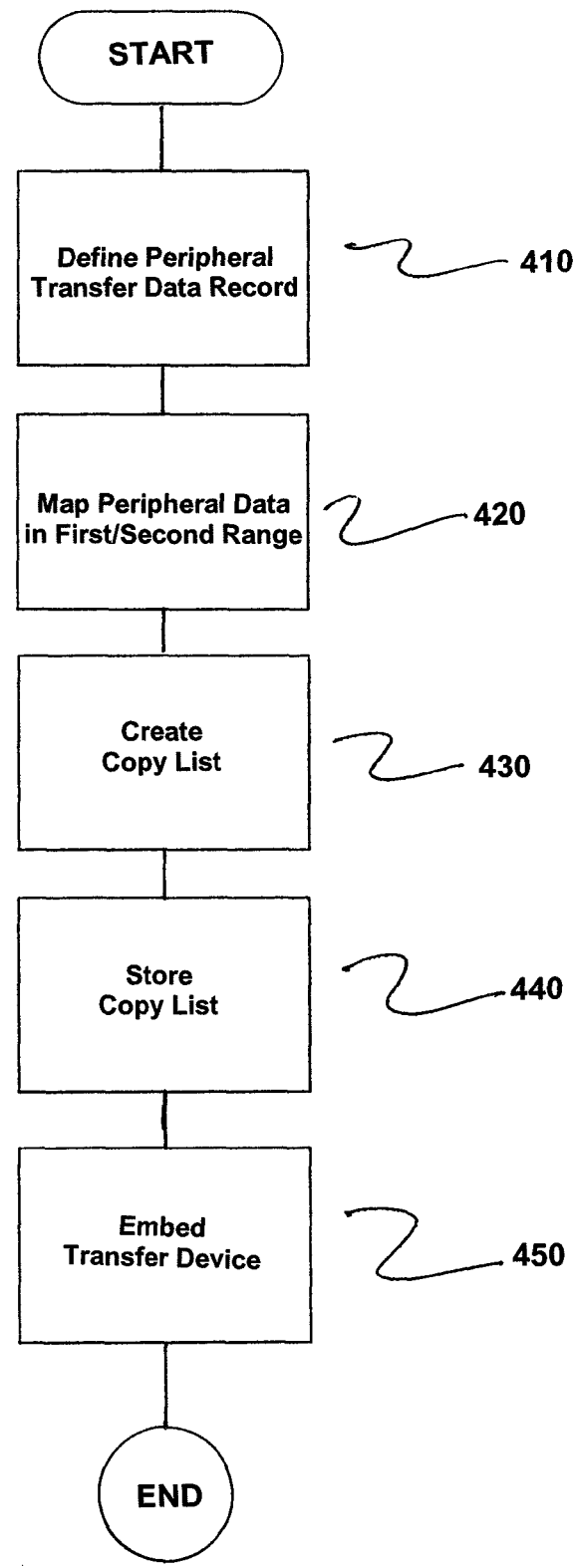
FIG. 4 is a flow chart of a method in accordance with an embodiment of the invention.

FIG. 4 is a flow chart of a method for exchanging peripheral data between a main module and a submodule a peripheral unit connected to the submodule, where data is read in or output through the peripheral unit. The method comprises defining a peripheral transfer data record having a first address range of the peripheral unit and a second address range of the main module, as indicated in step 410.

At least one of a peripheral data prevailing in the first address range is mapped into the second address range and peripheral data prevailing in the second address range is mapped into the first address range, as indicated in step 420.

A copy list having the peripheral transfer data record which is allocated a data range indication and a direction indication is created, as indicated in step 430. The copy list is stored in the submodule, as indicate in step 440. A transfer device is embedded into an operating system of the submodule, as indicated in step 450. Here, the transfer device accesses the copy list and allocates the peripheral data to corresponding address ranges based on the peripheral transfer data record.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for exchanging peripheral data between a main module and a submodule, a peripheral unit being connected to the submodule, wherein data is read in or output through said peripheral unit, the method comprising:
    defining a peripheral transfer data record having a first address range of the peripheral unit and a second address range of the main module;
    mapping at least one of peripheral data prevailing in the first address range into the second address range and peripheral data prevailing in the second address range into the first address range;
    creating a copy list having the peripheral transfer data record which is allocated a data range indication and a direction indication;
    storing the copy list in the submodule; and
    embedding a transfer device into an operating system of the submodule;
    wherein the transfer device accesses the copy list and allocates the peripheral data to corresponding address ranges based on the peripheral transfer data record.

2. The method as claimed in claim 1, further comprising:
    providing a memory area derived from the peripheral transfer data record in the submodule; and
    providing, with the memory area, a data interface for transferring the peripheral data to the main module and for transferring the peripheral data from the main module to the memory area.

3. The method as claimed in claim 1, further comprising:
    adding a priority list to the copy list, the priority list being processed as a priority by the transfer device for time-critical data.

4. The method as claimed in claim 2, further comprising:
    adding a priority list to the copy list, the priority list being processed as a priority by the transfer device for time-critical data.

5. The method as claimed in claim 1, further comprising:
    executing an application program executed in the submodule to access exchanged peripheral data.

6. The method as claimed in claim 1, wherein the copy list is created by a configuration tool;
    wherein the configuration tool accesses configuration data pertaining to a physical construction of the main module and submodules subordinate thereto; and wherein the peripheral units are subdivided into peripheral units assigned centrally to the submodule and into peripheral units assigned to the submodule in a decentralized manner.

* * * * *